United States Patent
Chan et al.

(10) Patent No.: US 10,069,899 B2
(45) Date of Patent: *Sep. 4, 2018

(54) SYSTEM AND METHOD OF SECURE FILE SHARING USING P2P

(71) Applicant: GPVTL Canada Inc., Mississauga (CA)

(72) Inventors: Boris Kai-Tik Chan, Toronto (CA); Allan Baril, Toronto (CA)

(73) Assignee: GPVTL Canada Inc., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/674,451

(22) Filed: Aug. 10, 2017

(65) Prior Publication Data
US 2017/0339215 A1  Nov. 23, 2017

Related U.S. Application Data

(63) Continuation of application No. 14/075,609, filed on Nov. 8, 2013, now Pat. No. 9,756,115.

(60) Provisional application No. 61/796,320, filed on Nov. 8, 2012.

(51) Int. Cl.
| | |
|---|---|
| H04L 29/08 | (2006.01) |
| H04L 29/06 | (2006.01) |
| G06F 17/30 | (2006.01) |
| H04W 92/18 | (2009.01) |
| H04W 84/18 | (2009.01) |
| H04W 8/00 | (2009.01) |

(52) U.S. Cl.
CPC ........ *H04L 67/06* (2013.01); *G06F 17/30165* (2013.01); *H04L 63/102* (2013.01); *H04L 63/168* (2013.01); *H04W 8/005* (2013.01); *H04W 84/18* (2013.01); *H04W 92/18* (2013.01)

(58) Field of Classification Search
CPC .............. G06F 17/30165; H04L 67/06; H04M 2250/64
See application file for complete search history.

(56) References Cited

U.S. PATENT DOCUMENTS

| | | | | |
|---|---|---|---|---|
| 7,958,270 | B2 * | 6/2011 | Sidon ...................... | H04L 51/38 709/206 |
| 8,077,157 | B2 * | 12/2011 | Sengupta ............ | G06F 3/04883 345/1.2 |
| 8,204,791 | B2 * | 6/2012 | Chavez .............. | G06Q 30/0283 705/1.1 |
| 8,693,484 | B2 * | 4/2014 | Karaoguz .............. | G06Q 20/10 370/229 |

(Continued)

*Primary Examiner* — Lashonda Jacobs
(74) *Attorney, Agent, or Firm* — Mahamedi IP Law LLP

(57) ABSTRACT

A method is provided for sharing a file. A first mobile device can generate a link and the link can enable a second mobile device to send a request to a permission server to access a file from a remote server. The permission server can determine a unique identifier of the second mobile device is associated with sufficient file sharing privileges to receive the file from the remote server. Additionally, the permission server can enable the second mobile device to download the file from the remote server, upon determining that the unique identifier is associated with sufficient file sharing privileges. Once the second mobile device with sufficient file sharing privileges downloads the file from the remote server, the first mobile device can receive a confirmation.

16 Claims, 5 Drawing Sheets

(56) References Cited

U.S. PATENT DOCUMENTS

| | | | |
|---|---|---|---|
| 8,964,947 B1* | 2/2015 | Noolu | H04M 3/541 379/88.01 |
| 9,438,761 B1* | 9/2016 | Thompson | H04N 1/00973 |
| 2005/0240773 A1* | 10/2005 | Hilbert | H04L 63/105 713/182 |
| 2006/0010204 A1* | 1/2006 | Jalava | G06Q 10/10 709/205 |
| 2007/0297426 A1* | 12/2007 | Haveson | H04L 12/2812 370/401 |
| 2007/0299681 A1* | 12/2007 | Plastina | G06Q 30/02 705/51 |
| 2007/0299737 A1* | 12/2007 | Plastina | G06Q 30/0207 705/14.1 |
| 2008/0091790 A1* | 4/2008 | Beck | H04L 67/06 709/217 |
| 2009/0013063 A1* | 1/2009 | Soman | G06F 17/30067 709/223 |
| 2009/0282462 A1* | 11/2009 | Skaria | G06F 21/6218 726/3 |
| 2010/0161752 A1* | 6/2010 | Collet | H04L 67/104 709/216 |
| 2010/0198871 A1* | 8/2010 | Stiegler | G06F 17/30168 707/783 |
| 2010/0257251 A1* | 10/2010 | Mooring | H04W 4/206 709/216 |
| 2010/0299522 A1* | 11/2010 | Khambete | H04L 63/061 713/168 |
| 2011/0083111 A1* | 4/2011 | Forutanpour | G06F 1/1694 715/863 |
| 2011/0254687 A1* | 10/2011 | Arponen | H04M 1/72525 340/540 |
| 2011/0276637 A1* | 11/2011 | Thornton | H04L 12/584 709/206 |
| 2012/0066749 A1* | 3/2012 | Taugbol | G06F 21/40 726/6 |
| 2012/0109987 A1* | 5/2012 | Broussard | G06F 17/30029 707/754 |
| 2012/0151067 A1* | 6/2012 | Piccinini | H04W 4/023 709/227 |
| 2012/0221636 A1* | 8/2012 | Surtani | H04L 12/6418 709/204 |
| 2012/0294352 A1* | 11/2012 | Koum | H04N 21/234309 375/240.01 |
| 2013/0325949 A1* | 12/2013 | Virani | G06F 9/541 709/204 |
| 2014/0067929 A1* | 3/2014 | Kirigin | H04L 67/06 709/204 |
| 2014/0214626 A1* | 7/2014 | Bowers | G06Q 50/01 705/26.81 |
| 2014/0359069 A1* | 12/2014 | Matute | H04W 12/08 709/218 |
| 2015/0099550 A1* | 4/2015 | Alharayeri | H04L 51/00 455/456.3 |
| 2015/0101060 A1* | 4/2015 | Schmitz | H04L 51/043 726/26 |
| 2015/0200975 A1* | 7/2015 | Perez | H04L 67/104 709/204 |
| 2015/0381588 A1* | 12/2015 | Huang | H04L 63/0435 713/153 |

* cited by examiner

SYSTEM AND METHOD OF SECURE FILE SHARING USING P2P

CROSS-REFERENCE TO RELATED APPLICATION

This application is a continuation of U.S. patent application Ser. No. 14/075,609, entitled "SYSTEM AND METHOD OF SECURE FILE SHARING USING P2P," filed Nov. 8, 2013, now issued as U.S. Pat. No. 9,756,115; which claims benefit of priority to Provisional U.S. Patent Application No. 61/796,320, entitled "SYSTEM AND METHOD OF SECURE FILE SHARING USING P2P," filed Nov. 8, 2012; all the aforementioned priority applications being incorporated by reference in their entirety.

FIELD OF INVENTION

The field of invention is generally related to mobile devices for example Smartphones and in particular to secure file sharing using peer-to-peer technology preferably using a P2P technology like Bluetooth or Near Field Communications (NFC).

BACKGROUND

Existing mobile devices e.g. phones, Smartphones, tablets and the like, have a multitude of functions that provide connectivity and communications services to a user. Such devices are used for making phone calls, checking e-mail, getting directions, playing games, searching the web, searching for places of interest on a map, amongst a host of other things.

Mobile devices have become an essential and inseparable part of the lifestyle. People use these devices for personal communications as well as for office communications, since carrying two separate devices, one for personal use and the other for office work, is not an efficient solution.

Additionally mobile devices are a fashion and trend statements and people bring personal mobile devices that they prefer e.g. Smartphones and tablets to the workplace and use them for work as well as personal communications. Another factor is that employers in order to curtail costs, do not want to be responsible for mobile device related bills and encourage the use of personal mobile devices in the workplace.

Thus a trend is emerging called "bring your own device." Many times use of such devices violates the corporate security policies. For example, when several people are in a meeting and one person sends a file to some or all the attendees by e-mail, a file which may only be shared with a select audience, there is no way to check what privileges the attendees have before they receive the file. Thus, co-workers who may not have the corporate clearance to receive sensitive data tend to receive it, since there are no checks in place when files are sent by e-mail as attachments using personal mobile devices. Further, the recipients may receive a file in unsecured form or in a form stripped of file protections (protections which may be intended to be device- or user-specific per corporate policy).

Therefore we note that prior art methods have inherent limitations. Accordingly, there is a need for providing a secure method of file sharing using Bluetooth or Near Field Communications (NFC) for improved corporate security such that the policies defined are taken into account when sharing files using personal mobile devices. It would be desirable to provide a method and system to overcome these disadvantages of the prior art.

SUMMARY

A secure method of file sharing is provided within the enterprise environment such that the security policies as defined by the organization are taken into account when sharing files from personal mobile devices.

The preferred embodiment of the invention provides a method for secure file sharing using P2P technologies like Bluetooth or Near Field Communications (NFC). In the present method, an application is installed on the mobile devices; and this application uses P2P technology to set up a peer-to-peer connection with other devices that are in the vicinity and have the same application installed on them. Using this application and the P2P connection, the sender sends a link to the file that they want to share with the recipient devices (and their users). The recipient(s) then clicks on the link, within the application, which then connects the recipient device(s) to the enterprise permissions server using WiFi or carrier network, where user privileges are queried and if the recipient(s) have sufficient privileges to be allowed to receive the file, then the file is downloaded to the recipient mobile device(s) from the file server where the file may be stored along with other sensitive enterprise data.

The system and method thus offer a way to follow corporate policies when circulating files among colleagues, contributing to improved overall document security.

According to a first aspect of the invention, a method is provided for sharing a file between a sender mobile device and a recipient mobile device. The sender mobile device discovers nearby mobile devices to the sender mobile device through a detection application. A recipient mobile device is selected from among the nearby mobile devices. A message is sent to the recipient mobile device including a link representing a file to be shared with the recipient mobile device. The link is actuatable on the recipient mobile device to request permission from a permission server. Upon that permission being granted, the file is permitted to be downloaded to the recipient mobile device from a file server. The sender mobile device receives a confirmation once the recipient mobile device has received the file.

Preferably, the discovering step uses a P2P network selected from among: Bluetooth, NFC, and WiFi.

Preferably, nearby mobile devices are displayed on a list or menu on the detection application. The nearby mobile devices can be selected from the list or menu.

Prior to sending the message, a link to the file to be shared is preferably generated on the sender mobile device. The file need not be stored on the sender mobile device when the link is generated. For example, the file may simply be accessible to the sender mobile device from remote storage (e.g. file server or another mobile device acting in the role of a server).

The recipient mobile device has a permission status with respect to the file. This permission status of the recipient mobile device is not known to the sender mobile device prior to sending the message.

Preferably, the message can be sent to multiple selected nearby mobile devices substantially simultaneously.

According to a second aspect of the invention, a method is provided for accessing on a recipient mobile device a file that has been shared by a sender mobile device. The recipient mobile device receives from a sender mobile device in proximity to the recipient mobile device a link representing a file to be shared with the recipient mobile device. Upon the link being actuated, the recipient mobile device automatically submits a request to a permission server in communication with the recipient mobile device. The request includes a first privilege parameter. Upon determination that the permission server has accepted the request based on the first privilege parameter, the recipient mobile device automatically receives a download of the file from a file server in communication with the recipient mobile device.

Prior to the receiving step, the recipient mobile device may need to first download an application for receiving shared files prior to the receiving step. The recipient mobile device may further need to first set the device to a discoverable mode.

Upon permission being denied, the recipient mobile device preferably displays an error condition.

Various types of first privilege parameters are possible. In one example, the first privilege parameter includes a unique identifier of the recipient mobile device or its user. The unique identifier may be selected from among: MAC address, IP address, and email address.

The file download may also include a second privilege parameter. In one example, the second privilege parameter is a password or other credential to access the file. In another example, the second privilege parameter is a pre-set limit on access or use or editability of the file by the recipient mobile device or its user (e.g. read-only, limits on ability to send to further devices or time-limited access).

DETAILED DESCRIPTION

Figure 1:
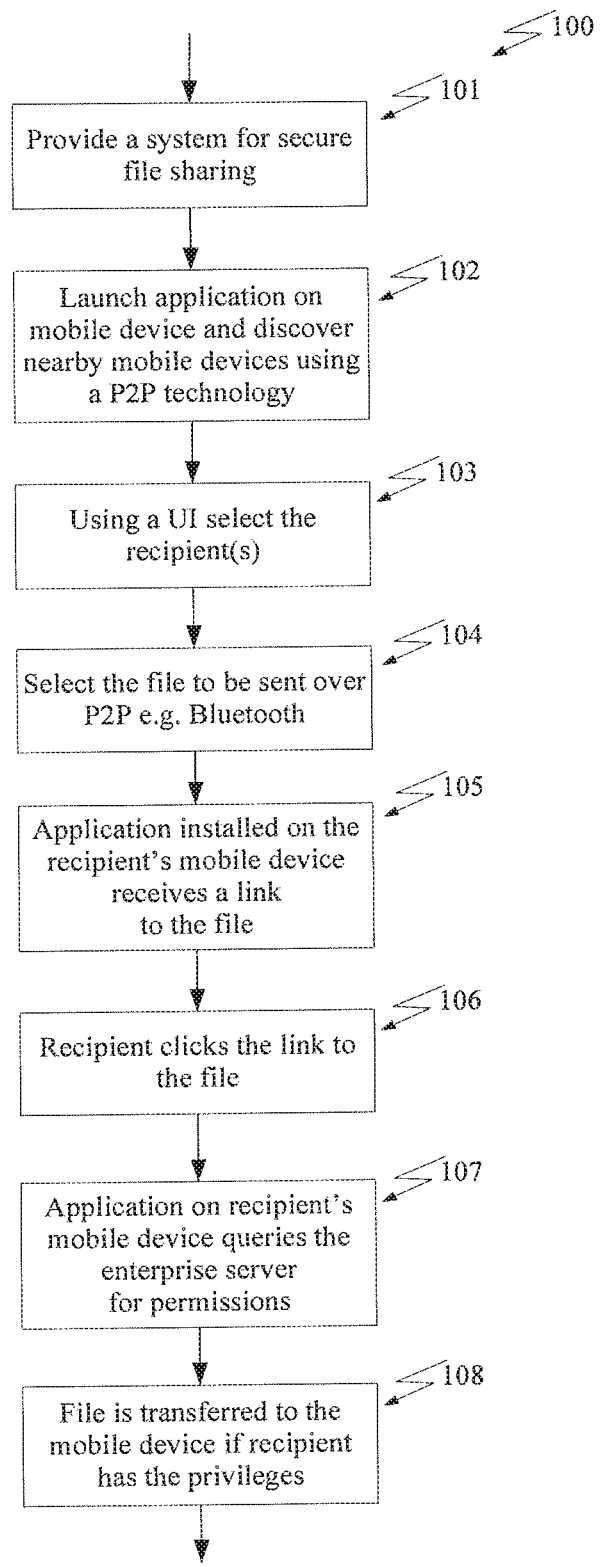
FIG. 1 is a flow diagram illustrating the primary steps of the method of sharing a file between a sender mobile device and recipient mobile device(s), according to a preferred embodiment.

Before embodiments of the invention are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviors that other programming languages might perform during compilation, JavaScript, PHP, Perl, Python and Ruby are examples of dynamic languages. Additionally, computer code may also be written using a web programming stack of software, which may mainly be comprised of open source software, usually containing an operating system, Web server, database server, and programming language. LAMP (Linux, Apache, MySQL and PHP) is an example of a well-known open-source Web development platform. Other examples of environments and frameworks using which computer code may also be generated are Ruby on Rails which is based on the Ruby programming language, or node.js which is an event-driven server-side JavaScript environment.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A device that enables a user to engage with an application using the invention, including a memory for storing a control program and data, and a processor (CPU) for executing the control program and for managing the data, which includes user data resident in the memory and includes buffered content. The computer may be coupled to a video display such as a television, monitor, or other type of visual display while other devices may have it incorporated in them (iPad). An application or a game or other simulation may be stored on a storage media such as a DVD, a CD, flash memory, USB memory or other type of memory media or it may be downloaded from the internet. The storage media can be inserted to the console where it is read. The console can then read program instructions stored on the storage media and present a user interface to the user.

FIG. 1 is a flow diagram illustrating the primary steps of the method of sharing a file between a sender mobile device and recipient mobile device(s). According to the method, a system is provided for secure file sharing on mobile devices 101. In a preferred embodiment, the system and method may be implemented on a mobile device like a Smartphone, a tablet or the like. Devices where invention can be advantageously implemented may include but not limited to an iPhone, iPad, Smartphones, Android phones, personal computers e.g. laptops, tablet computers, touch-screen computers running any number of different operating systems e.g. MS Windows, Apple iOS, Linux, Ubuntu, etc.

In some embodiments, the device is portable. In some embodiments, the device has a touch-sensitive display with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include providing maps and directions, telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

The application is launched on a sender mobile device and the application discovers the nearby mobile devices using a P2P technology e.g. Bluetooth 102. Using a UI, the recipient(s) are selected 103. The recipients may be listed in a drop down menu or a list with selection radio buttons or any other user friendly method that is widely used on mobile devices especially ones with touch screens.

The sender selects the file to be sent over peer-to-peer (P2P) networking technology e.g. Bluetooth 104. A peer-to-peer, commonly abbreviated to P2P, is any distributed network architecture composed of participants that make a portion of their resources (such as processing power, disk storage or network bandwidth) directly available to other network participants, without the need for central coordination instances (such as servers or stable hosts). Peer-to-peer networks are typically formed dynamically by ad-hoc additions of nodes. Peers are both suppliers and consumers of resources, in contrast to the traditional client-server model where only servers supply, and clients consume.

Peer-to-peer systems often implement an Application Layer overlay network on top of the native or physical network topology. Such overlays are used for indexing and peer discovery. Content is typically exchanged directly over the underlying Internet Protocol (IP) network. Anonymous peer-to-peer systems are an exception, and implement extra routing layers to obscure the identity of the source or destination of queries.

A P2P computer network is one in which each computer in the network can act as a client or server for the other computers in the network, allowing shared access to various resources such as files, peripherals, and sensors without the need for a central server. P2P networks can be set up within the home, a business, or over the Internet. Each network type requires all computers in the network to use the same or a compatible program to connect to each other and access files and other resources found on the other computer. P2P networks can be used for sharing content such as audio, video, data, or anything in digital format.

P2P is a distributed application architecture that partitions tasks or workloads among peers. Peers are equally privileged participants in the application. Each computer in the network is referred to as a node. P2P networks are typically used for connecting nodes via largely ad hoc connections. Sharing content files containing audio, video, data or anything in digital format is very common, and real time data, such as telephony traffic, is also passed using P2P technology.

This model of network arrangement differs from the client-server model where communication is usually to and from a central server. A typical example of a file transfer that does not use the P2P model is the File Transfer Protocol (FTP) service in which the client and server programs are distinct: the clients initiate the transfer, and the servers satisfy these requests.

A pure P2P network does not have the notion of clients or servers but only equal peer nodes that simultaneously function as both "clients" and "servers" to the other nodes on the network. This model of network arrangement differs from the client-server model where communication is usually to and from a central server.

The P2P overlay network consists of all the participating peers as network nodes. There are links between any two nodes that know each other: i.e. if a participating peer knows the location of another peer in the P2P network, then there is a directed edge from the former node to the latter in the overlay network. Based on how the nodes in the overlay network are linked to each other, we can classify the P2P networks as unstructured or structured.

In structured P2P networks, peers are organized following specific criteria and algorithms, which lead to overlays with specific topologies and properties. Structured P2P systems are appropriate for large-scale implementations due to high scalability and some guarantees on performance. In structured peer-to-peer networks, connections in the overlay are fixed. They typically use distributed hash table-based (DHT) indexing.

Unstructured P2P networks do not impose any structure on the overlay networks. Peers in these networks connect in an ad-hoc fashion based on some loose set of rules. Ideally, unstructured P2P systems would have absolutely no centralized elements/nodes, but in practice there are several types of unstructured systems with various degrees of centralization. In an 'adhoc' network, the removal of nodes has no significant impact on the network. The distributed architecture of an application in a peer-to-peer system provides enhanced scalability and service robustness.

Unstructured peer-to-peer networks do not provide any algorithm for organization or optimization of network connections. In particular, three models of unstructured architecture are defined. In pure peer-to-peer systems the entire network consists solely of equipment peers. There is only one routing layer, as there are no preferred nodes with any special infrastructure function. Hybrid peer-to-peer systems allow such infrastructure nodes to exist, often called supernodes. In centralized peer-to-peer systems, a central server is used for indexing functions and to bootstrap the entire system. Although this has similarities with a structured architecture, the connections between peers are not determined by any algorithm. The first prominent and popular peer-to-peer file sharing system, Napster, was an example of the centralized model. Gnutella and Freenet, on the other hand, are examples of the decentralized model. Kazaa is an example of the hybrid model.

Bluetooth is a technology standard for exchanging data over short distances (using short-wavelength radio transmissions) from fixed and mobile devices, creating personal area networks (PANs) with high levels of security. Bluetooth can connect several devices, overcoming problems of synchronization. Bluetooth is a standard wire-replacement communications protocol primarily designed for low power consumption, with a short range. Because the devices use a radio (broadcast) communications system, they do not have to be in visual line of sight of each other.

A master Bluetooth device can communicate with a maximum of seven devices in a piconet (an ad-hoc computer network using Bluetooth technology), though not all devices reach this maximum. The devices can switch roles, by agreement, and the slave can become the master.

At any given time, data can be transferred between the master and one other device (except for the less-used broadcast mode). The master chooses which slave device to address; typically, it switches rapidly from one device to another in a round-robin fashion.

Any Bluetooth device in discoverable mode will transmit the following information on demand:
Device name
Device class
List of services
Technical information (for example: device features, manufacturer, Bluetooth specification used, clock offset)

Any device may perform an inquiry to find other devices to connect to, and any device can be configured to respond to such inquiries. However, if the device trying to connect knows the address of the device, it always responds to direct connection requests and transmits the information shown in the list above if requested. Use of a device's services may require pairing or acceptance by its owner, but the connection itself can be initiated by any device and held until it goes out of range. Some devices can be connected to only one device at a time, and connecting to them prevents them from connecting to other devices and appearing in inquiries until they disconnect from the other device.

Every device has a unique 48-bit address (MAC address). However, these addresses are generally not shown in inquiries. Instead, friendly Bluetooth names are used, which can be set by the user. This name appears when another user scans for devices and in lists of paired devices. Most phones have the Bluetooth name set to the manufacturer and model of the phone by default.

Application installed on the recipient's mobile device receives a link to the file 105. This link is sent via the Bluetooth P2P network that is established between the mobile devices. In alternate embodiments of the invention Near Field Communications (NFC) may be used for setting up the P2P network.

The recipient clicks the link to the file 106. An application on the recipient's mobile device queries the enterprise server for permissions 107. This query from the recipient mobile device to the corporate server is essentially done over the internet. The recipient mobile device may connect to the internet using corporate WiFi, free WiFi, mobile operator network or another method that may connect the recipient mobile device to the corporate server that manages the user privileges.

If the recipient has the privileges to be able to access this file, the file is transferred to the recipient mobile device 108. If the recipient does not have the privileges to access this file, optionally an error condition may be displayed.

Figure 2:
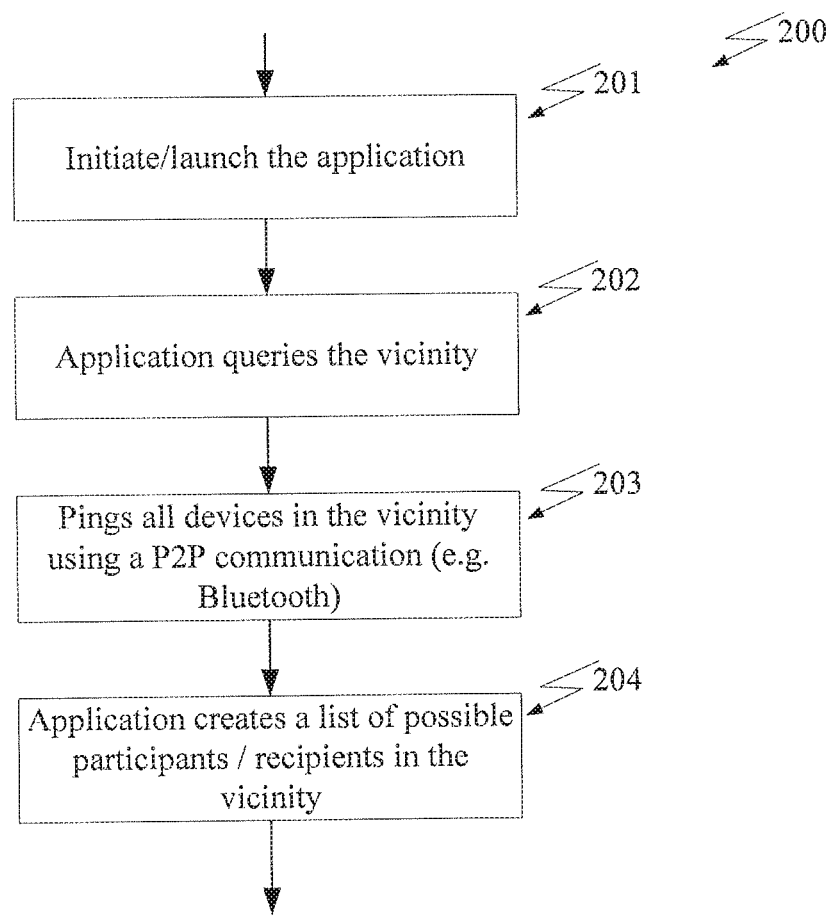
FIG. 2 is a flow diagram further illustrating the detecting step of the method.

FIG. 2 shows one embodiment of the invention. The application (that had previously been installed on the device) is launched/initiated 201.

The application queries the vicinity using a P2P communications technology e.g. Bluetooth or Near Field Communications (NFC), WiFi or other such technology 202. For this application, we use Bluetooth as the preferred technology of embodiment. It is to be understood that this is for exemplary purposes and is not limiting. In fact any P2P communications technology that can achieve this purpose can be used.

Application installed on the mobile device pings all devices in the vicinity that have the same application installed on them using say Bluetooth 203. In alternate embodiments of the invention other P2P technologies may be used for example Near Field Communications (NFC).

Application creates a list of possible participants/recipients in the vicinity 204. The recipients may be listed in a drop down menu or a list with selection radio buttons or any other user friendly method that is widely used on mobile devices especially ones with touch screens.

Figure 3:
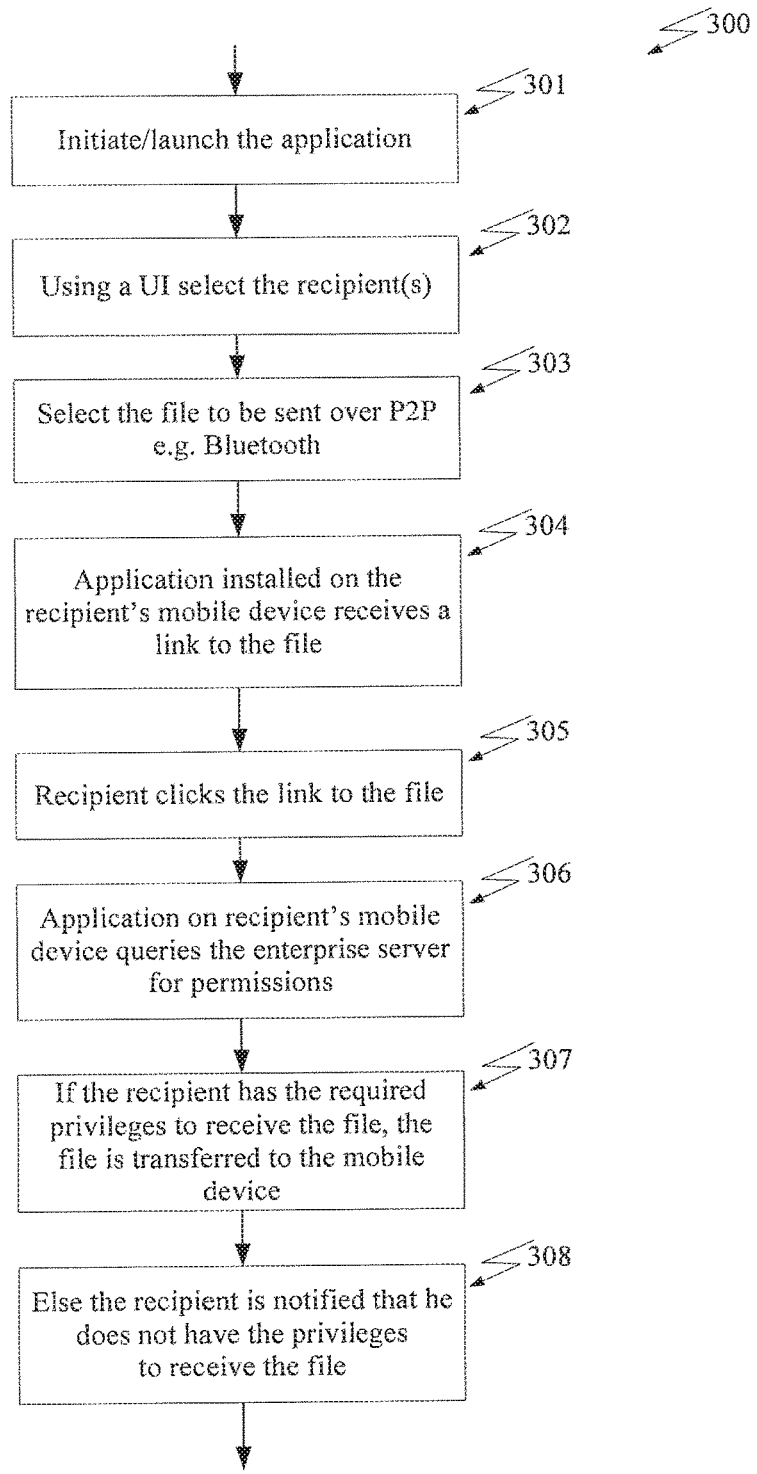
FIG. 3 is a flow diagram illustrating the primary steps of the method of receiving a shared file on a recipient mobile device, according to a preferred embodiment.

FIG. 3 shows one embodiment of the invention. The application is initiated/launched on the mobile device 301.

Using a UI, the sender selects the recipient(s) 302. The file to be sent over P2P (e.g. Bluetooth) to the selected recipient(s) is selected 303. The file selection on a mobile device can be done using a touch screen interface and is a widely implemented prior art technique that is well understood in the field.

The application installed on the recipients' mobile device receives a message containing a link to the file 304. The recipient clicks on the link to the file 305.

The application on the recipient's mobile device queries an enterprise server for permissions 306. If the recipient has the required privileges to access the file, the file is transferred to the mobile device 307. Otherwise, the recipient is notified that he does not have the privileges to receive the said file 308. (Confirmation messages can also be sent to the application on the sender's device, so the sender will know who has received the file.)

Figure 4:
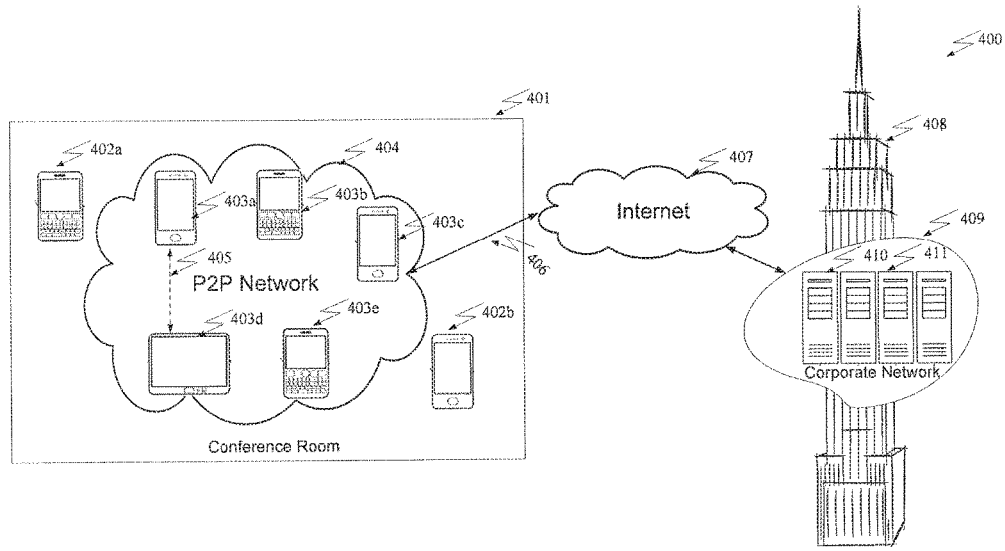
FIG. 4 is a network diagram illustrating communications between a sender and recipient mobile devices and a corporate network.

FIG. 4 shows an exemplary scenario 400 where several participants are in a meeting in a conference room 401. Participants 402a and 402b have mobile devices but do not have the application of the invention installed on these devices. Participants 403a, 403b, 403c, 403d and 403e have the application of the invention installed on these mobile devices. P2P network 404 is formed by the mobile devices 403a through 403e. P2P connection (over e.g. Bluetooth) 405 is established between devices 403d and 403a. Using P2P or WiFi or other networking technology connection 406 these mobile devices are able to connect to the internet 407 and establish a connection at the corporate headquarters 408 with the corporate network 409 where permissions server e.g. SharePoint 410 and file server 411 are located.

Microsoft SharePoint is a Web application platform developed by Microsoft, SharePoint comprises a multipurpose set of Web technologies which are useful for many different types and sizes of organizations. SharePoint can be used to provide intranet portals, document & file management, collaboration, social networks, extranets, websites, enterprise search, and business intelligence. It also has capabilities around system integration, process integration, and workflow automation. SharePoint also incorporates a complete development stack based on web technologies and standards-based APIs. As an application platform, SharePoint provides central management, governance, and security controls for implementation of these requirements.

This list is exemplary and not limiting, in fact this list may include all or any of the other items that are obvious to persons skilled in the art.

Figure 5:
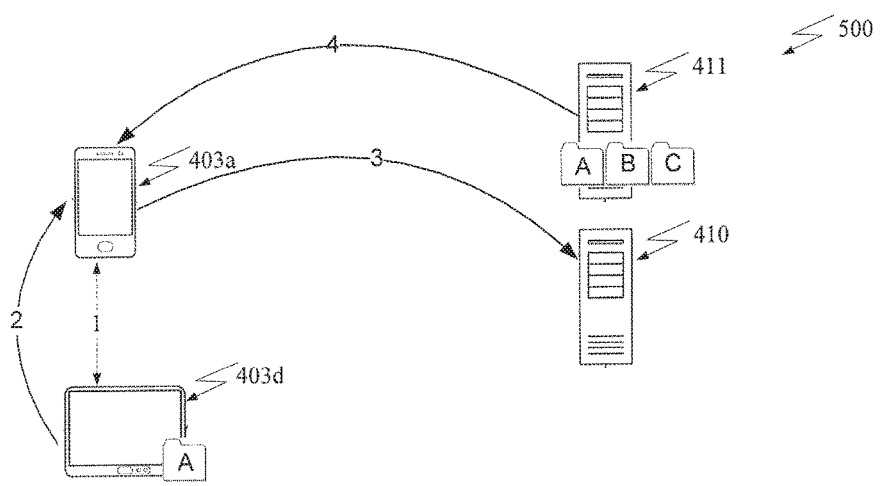
FIG. 5 is a network diagram illustrating communications between sender and recipient mobile devices and separate file and permission servers.

FIG. 5 shows the process of establishing a P2P connection and receiving the requisite file from the file server using the system and method of the invention 500.

The first step is peer discovery between mobile device 403d wanting to send a file A to mobile device 403a. This step is depicted by the dashed line and number 1.

The second step is the P2P transmittal from mobile device 403d to mobile device 403a of the resource location of the file A. This step is depicted by the solid line and number 2.

The third step is the authentication of mobile device 403a with the permissions server 410. This step is depicted by the solid line and number 3.

If the permission server finds the privileges for mobile device 403a and these privileges contain permissions for this device to receive the file A that user of mobile device 403d is wanting to send to user of mobile device 403a, then the fourth step is reached whereby the resource is downloaded from the location e.g. a file server 411 where files A, B and C are stored. This step is depicted by the solid line and number 4.

Figure 6:
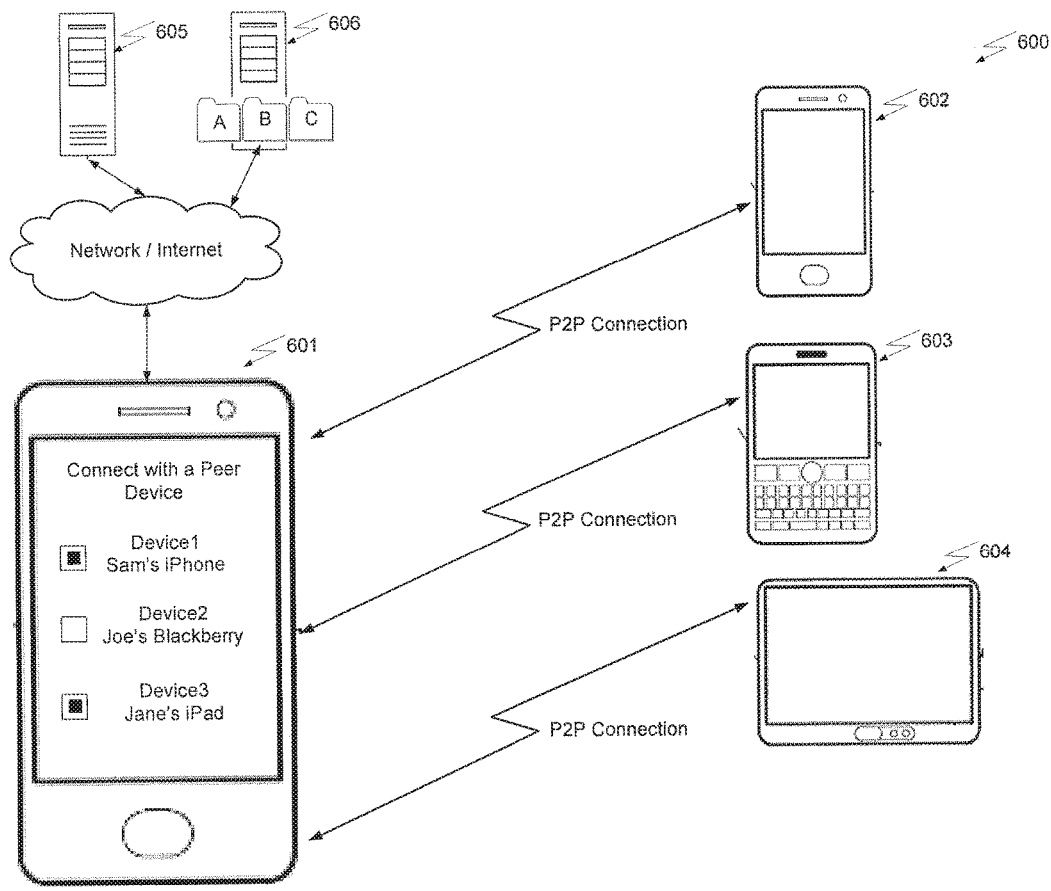
FIG. 6 is a network diagram showing in particular detail the detection and selection of recipient mobile devices on a sender mobile device.

The peer discovery and selection of recipient mobile devices is shown in greater detail in FIG. 6. Within the system 600, the sender mobile device 601 has the file sharing application open. As shown on the screen, three devices are detected: Device1 Sam's iPhone (which corresponds to device 602), Device2 Joe's Blackberry (which corresponds to device 603) and Device3 Jane's iPad (which corresponds to device 604). Intended recipients of the file can be selected (e.g. by radio buttons as shown). In this case, the selected recipients are Device1 and Device3. The sender mobile device 601 in connection with the file server 606 and permission server 605 can then formulate a message with a link to the file to be shared to the selected devices.

It should be understood that although the term application has been used as an example in this disclosure but in essence the term may also imply to any other piece of software code where the embodiments of the invention are incorporated. The software application can be implemented in a stand-alone configuration or in combination with other software programs and is not limited to any particular operating system or programming paradigm described here. Thus, this invention intends to cover all applications and user interactions described above as well as those obvious to persons skilled in the art.

The computer program comprises: a computer usable medium having computer usable program code, the computer usable program code comprises: computer usable program code for presenting graphically to the users options for scrolling via the touch-screen interface.

Several exemplary embodiments/implementations of the invention have been included in this disclosure. There may be other methods obvious to persons skilled in the art, and the intent is to cover all such scenarios. The application is not limited to the cited examples, but the intent is to cover all such areas that may be benefit from this invention.

The device may include but not limited to a personal computer (PC), which may include but not limited to a home PC, corporate PC, a Server, a laptop, a Netbook, a Mac, a cellular phone, a Smartphone, a PDA, an iPhone, an iPad, an iPod, an iPad, a PVR, a settop box, wireless enabled Blu-ray player, a TV, a SmartTV, wireless enabled Internet radio, e-book readers e.g. Kindle or Kindle DX, Nook, etc. and other such devices that may be used for the viewing and consumption of content whether the content is local, is generated on demand, is downloaded from a remote server where is exists already or is generated as a result. Source Device where content is located or generated and Recipient Device where content is consumed may be running any number of different operating systems as diverse as Microsoft Windows family, MacOS, iOS, any variation of Google Android, any variation of Linux or Unix, PalmOS, Symbian OS, Ubuntu or such operating systems used for such devices available in the market today or that will become available as a result of the advancements made in such industries.

The intent of the application is to cover all such combinations and permutations not listed here but that are obvious to persons skilled in the art. The above examples are not intended to be limiting, but are illustrative and exemplary.

The examples noted here are for illustrative purposes only and may be extended to other implementation embodiments. While several embodiments are described, there is no intent to limit the disclosure to the embodiment(s) disclosed herein. On the contrary, the intent is to cover all alternatives, modifications, and equivalents obvious to those familiar with the art.

As can be seen from the above descriptions, the invention provides a system and method for secure sharing of files when using mobile devices in accordance with the enterprise security policies, thus offering an improved security model.

What is claimed is:

1. A method of sharing a file, the method performed by one or more processors of a sender mobile device and comprising:
   generating a link, by a first mobile device, to enable a second mobile device to send a request to a permission server to access the file from a remote server;
   determining, by the permission server, a unique identifier of the second mobile device is associated with sufficient file sharing privileges to receive the file from the remote server;
   upon determining that the unique identifier is associated with sufficient file sharing privileges, enabling the second mobile device, by the permission server, to download the file from the remote server; and
   receiving a confirmation, on the first mobile device, once the second mobile device with sufficient file sharing privileges downloads the file from the remote server.

2. The method of claim 1, further comprising:
   sending a message including the link, by the first mobile device and to the second mobile device, the second mobile device being associated with unique identifier that is associated with a permission status that corresponds to a file sharing privilege.

3. The method of claim 2, further comprising:
   generating the link to the file to be shared prior to sending the message.

4. The method of claim 3, wherein the file is not stored on the sender mobile device.

5. The method of claim 2, wherein the permission status of the second mobile device has not been determined by the first mobile device prior to sending the message.

6. The method of claim 5, wherein the message is sent to the second mobile device over a peer-to-peer network, and wherein the second mobile device communicates with the permission server and the remote server over a second network.

7. The method of claim 1, further comprising:
   discovering nearby mobile devices using a peer-to-peer network utilizing one of a Bluetooth, a NFC, or a WiFi protocol; and
   receiving user input to select the second mobile device from the discovered nearby mobile devices.

8. The method of claim 7, wherein the nearby mobile devices are displayed on a drop-down list on a user interface of a detection application, and wherein the second mobile device is selected from the drop-down list.

9. A method of accessing, on a first mobile device, a file that has been shared by a second mobile device, the method comprising:
   receiving, by the first mobile device, a message from the second mobile device, the message including a link to enable the first mobile device to send a request to a permission server to access the file from a remote server of an enterprise entity;
   in response to a user actuating the link to send the request, transmitting a unique identifier of the first mobile device to the permission server, wherein the permission server determines whether the unique identifier is associated with sufficient file sharing privileges to receive the file from the remote server;
   upon determining by the permission server that the unique identifier is associated with sufficient file sharing privileges to receive a download of the file from the remote server; and
   generating a confirmation to the second mobile device once the file is downloaded using the link.

10. The method of claim 9, wherein the link is received via a peer-to-peer connection based on an application for sharing files executing on each of the first mobile device and the second mobile device.

11. The method of claim 9, further comprising:
   setting the first mobile device to a discoverable mode to enable the second mobile device to discover the first mobile device.

12. The method of claim 9, further comprising:
   upon determination by the permission server that the second mobile device does not comprise sufficient privileges, displaying an error condition.

13. The method of claim 9, wherein the unique identifier comprises one of a MAC address, an IP address, or an email address.

14. The method of claim 9, wherein the download of the file includes a privilege parameter that must be satisfied to access the file.

15. The method of claim 14, wherein the privilege parameter comprises a password or credential to access the file.

16. The method of claim 14, wherein the privilege parameter comprises a pre-set limit on access or use of the file by the first mobile device.

* * * * *